J. MATTHEWS.

Soda-Water Fountain.

No. 8,834. Reissued Aug. 5, 1879.

Witnesses:
John C. Dumbridge
Willy J. E. Schmitz.

Inventor:
John Matthews
by his attorney
A. V. Breeen

UNITED STATES PATENT OFFICE.

JOHN MATTHEWS, OF NEW YORK, N. Y.

IMPROVEMENT IN SODA-WATER FOUNTAINS.

Specification forming part of Letters Patent No. 128,411, dated June 25, 1872; Reissue No. 8,834, dated August 5, 1879; application filed June 26, 1879.

*To all whom it may concern:*

Be it known that I, JOHN MATTHEWS, of the city, county, and State of New York, have invented a new and Improved Fountain for Soda-Water and other Aerated or Gaseous Liquids; and I do hereby declare that the following is a full, clear, and exact description of the same, reference being had to the accompanying drawings, forming part of this specification, and in which—

Figure 1:
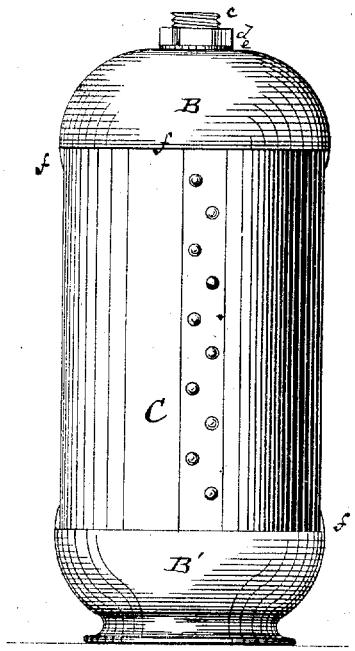
Figure 2:
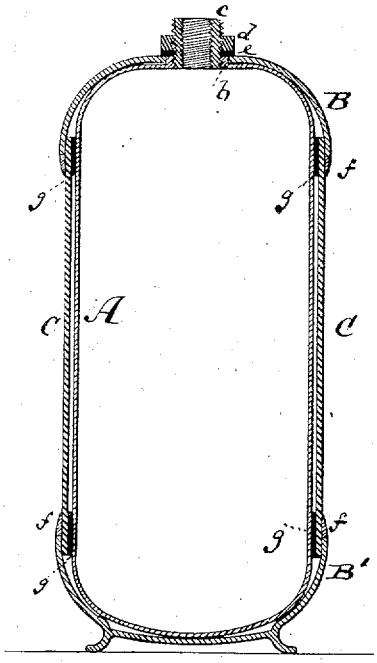

Figure 1 is an exterior longitudinal view, and Fig. 2 a central longitudinal section, of a fountain constructed in accordance with my improvement.

My invention consists in a novel construction of a tin-lined steel fountain for soda-water and other aerated or gaseous liquids, such fountain combining lightness with strength, and being of cylindrical form and uniform dimensions, or thereabout, throughout its length, thereby adding to the convenience of packing and handling; also, being exempt from expansion or permanent lateral distention by the interior pressure to which it is subjected, thus preserving its form and contributing to its durability. Fountains for the like purpose, as previously made, have been largely expansive, and retained the set given to them by extension, and being otherwise objectionable.

In the accompanying drawings, A represents a block-tin interior body of cylindrical form, with hemispherical or reduced ends, the same constituting the tin lining of the fountain, and being provided at one of its ends with a neck, *b*, for introduction of the usual or any suitable connections by which the fountain is charged and its contents drawn off, said neck receiving or having screwed into it a screw-coupling, *c*, secured by a nut and washer, *d e*, on the exterior of an outer end cap, B, for making the connection.

C is the exterior shell or body proper, made of galvanized sheet-steel, as may also be the end caps, B B′, which are soldered to or over the extremities of the same, and constitute, as it were, parts of said body C, that surrounds or fits over the tin lining A. The end caps, B B′, are united to the body C, without flanges or projections, by tin joints, as at *f f*, made by soldering with pure tin, which, being a ringing metal, unites closely with the steel exterior to make a firm and durable joint, as other solders having lead in them will not do.

Bands *g g* of brown paper or other non-conducting material are introduced between the tin lining A and steel body C, at the ends of the latter, to prevent the tin of the lining from being melted by the heat used in making the pure-tin joints *f f*. The fountain is also filled with water for the same purpose prior to making said joints.

The non-stretching character of the body C, by reason of the same being of steel, insures the fountain preserving its shape, and the absence of end flanges provides for the close packing of a series of such formations when transporting or storing them.

I claim—

1. The combination of the inner continuous tin fountain, A, having neck *b*, with the rigid inclosing-shell, made in sections, substantially as herein shown and described.

2. The tin vessel A, incased by a cylinder, C, and ends B B′, in the manner substantially as described, as a new and improved article of manufacture, for the purpose specified.

3. The combination of the inner vessel, A, with the exterior covering, made in sections, which are united after being placed around the vessel A, substantially as specified, the inner vessel being entirely continuous within the covering.

4. The combination of the inner vessel, A, with the surrounding covering or shell, and with intermediate bands, *g g*, of paper or non-conducting material, substantially as specified.

JOHN MATTHEWS.

Witnesses:

T. B. MOSHER,

F. V. BRIESEN.